Sept. 4, 1956

W. W. SLOANE 2,761,227

MUCKING MACHINES

Filed Dec. 16, 1953

INVENTOR.
WILLIAM W. SLOANE
BY
Murray A. Gleeson
ATTORNEY

Sept. 4, 1956

W. W. SLOANE 2,761,227

MUCKING MACHINES

Filed Dec. 16, 1953

INVENTOR.
WILLIAM W. SLOANE
BY
Murray A. Gleeson
ATTORNEY

Sept. 4, 1956 W. W. SLOANE 2,761,227
MUCKING MACHINES
Filed Dec. 16, 1953 6 Sheets-Sheet 6

INVENTOR.
WILLIAM W. SLOANE
BY
Murray A. Gleeson
ATTORNEY

United States Patent Office 2,761,227
Patented Sept. 4, 1956

2,761,227

MUCKING MACHINES

William W. Sloane, Chicago, Ill., assignor to Goodman Manufacturing Company, Chicago, Ill., a corporation of Illinois Application December 16, 1953, Serial No. 398,469

8 Claims. (Cl. 37—116)

This invention relates generally to mucking machines, and more particularly to improvements in apparatus for controlling the operation of a bucket or scoop of such machine.

In the mucking machines of the prior art the removal of muck or spoil from a bank or pile thereof has been been accomplished by the crowding of the bucket into the lowermost part of the bank and lifting the bucket against the weight of the spoil superimposed above the material in such bucket, and then raising the material further for discharge on to an endless conveyor forming a part of the machine. In such machines the crowding operation entails movement of the entire machine upon its crawler treads or wheels, and the entire machine is ordinarily backed away in part from the bank or pile before discharge of the bucket on to the conveyor. The general type of machine described may be that as disclosed in one or more patents issued to Anthony Biedess, Patent No. 2,627,357, being an example of the general form of a machine of such type.

According to the present invention, the steps of removing spoil from such a bank do not entail the lifting operation required in the machines of the general type referred to, and the material is removed from the bank by what may be generally described as a hoeing operation. In the machine according to the present invention the step of loading the bucket is accomplished by moving the bucket in a generally downward and backward direction in the spoil bank, and after being so loaded, moving the bucket along the floor of the tunnel or mine, and then lifting same through only a small distance sufficient to dump the material on to an endless conveyor.

The machine according to the present invention is more particularly adapted for use in tunneling or mining operations where space considerations for the operation of the machine are of prime importance. According to the present invention, the bucket or scoop for removing spoil resulting from the tunneling operation is arranged to be moved by a number of flexible draft means, such as wire cables, which are controlled by an operator situated at the machine. The movement of the bucket is under the control, for example, of a number of cables which operate in what is essentially a closed loop, so that the bucket may be crowded into a bank of spoil by a pair of such cables, which are wrapped about a pair of winding drums, return of the bucket being accomplished by a pair of cables trained about a pair of winding drums or sheaves disposed at the end of a boom which is swingable about a vertical axis and also movable about a horizontal axis, the latter two cables being wrapped about a pair of winding drums which turn on an axis common to the drums for the flexible strands crowding the bucket into the bank of spoil.

The invention is also characterized by the use of another flexible strand or cable which is connected to the bucket, and which is wrapped about a third winding drum also having an axis of rotation common to the drums previously described, the last named cable being used to control in part the position of the bucket so that same may be tilted to dump upon an endless conveyor.

The cables for effecting the return of the bucket to the end of the boom, and the cable for controlling the position of the bucket are arranged to be controlled by individual hydraulic means which control the effective length of said strands so that the bucket may be both elevated above the endless conveyor and be tilted as has been previously described.

Both the cables for effecting movement of the bucket in a direction to scoop material from the bank of spoil, and the cables for returning the bucket to the end of the boom, are controlled in their effective length so that the bucket may be suitably tipped to an angle for most effective digging action, and then later tilted to the proper position for dragging along the ground before being raised for discharge above the endless conveyor. To such end the winding sheaves for the cables connected to the bucket are arranged with tapered and grooved peripheries, and the aforesaid cables are so wrapped about the winding sheaves that the cables for moving the bucket in a direction to scoop material are being wound on their sheaves first at a slow rate but later at a faster rate, while the return cables are being payed off from their sheaves first at a fast rate and later at a slower rate. By so doing, at the start of the digging operation the scoop may be suitably tilted for the best digging angle into a pile of material, and may thereafter be dragged along the ground in filled condition.

A feature of the invention lies in the provision of winding drums rotating about a common axis, and the provision of a differential mechanism for giving differential movement of the winding drums for the flexible strands controlling the return of the bucket, so that swinging movement of the boom may be accommodated.

Another feature of the invention resides in the provision of a turret upon which are mounted all of the hydraulic means for controlling the swinging of the boom and for controlling the length of the cables to achieve the several described movements of the bucket, said turret also affording a center past which all of the cables for controlling both the elevation and tilting of the bucket must move.

One of the principal objects of the invention is to provide a novel excavating machine where all of the movements of the bucket or scoop thereof are controlled by cables, and wherein the control of such cables is effected from winding drums all rotatable upon a common center, and wherein the control of the effective length of certain of the cables is accomplished by hydraulic means cooperating with the several winding drums.

Another object of the invention is to provide a differential mechanism enabling the cables to have variable lengths according to the amount of swing of the boom, and to operate such differential mechanism controllably according to any variation in resistance of the bucket or scoop on the ends thereof.

Other objects and important features of the invention will be apparent from a study of the following specification taken with the drawings which together show a preferred embodiment of the invention and what is now considered to be the best mode of practicing the principles thereof. Other embodiments of the invention may be suggested to those having the benefit of the teachings herein, and it is therefore intended that the scope of the invention not be limited by the precise embodiment herein shown, nor otherwise than by the scope of the claims appended to this specification.

Figure 1:
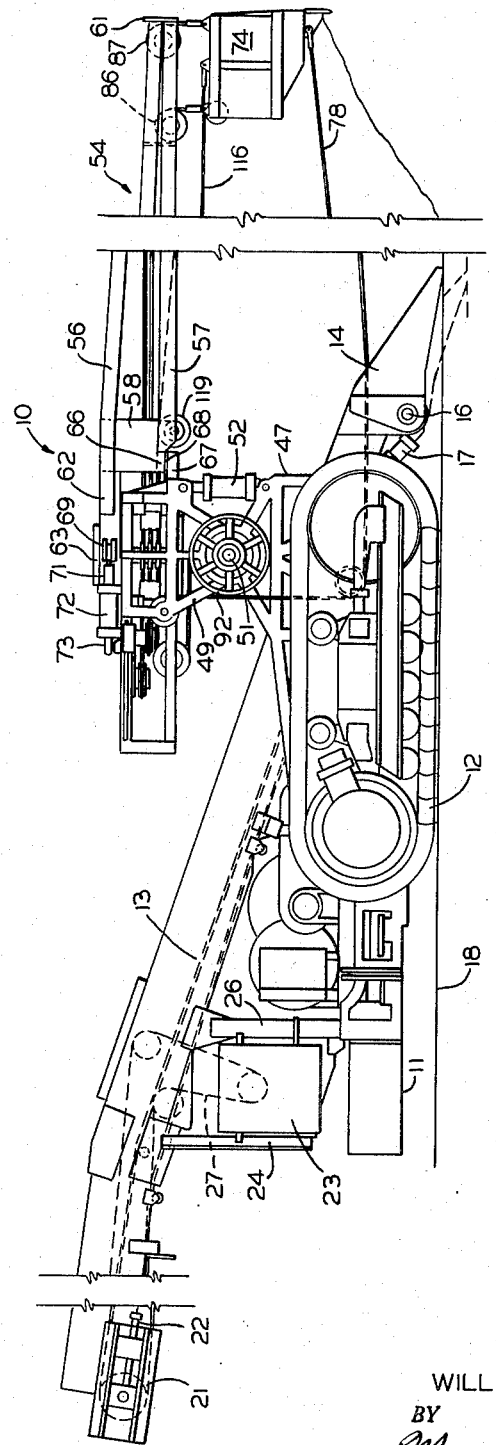
Fig. 1 is a side view of a mucking machine having embodied therein the improvements according to the present invention.
Figure 2:
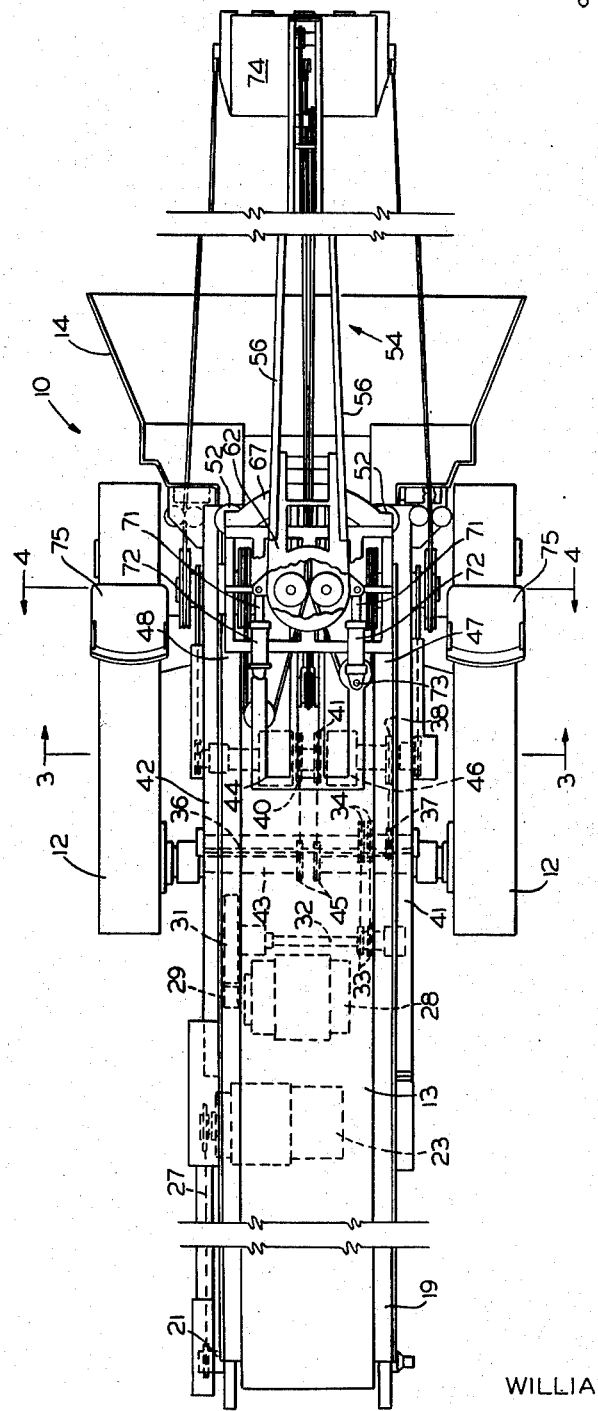
Fig. 2 is a top view thereof.

Referring now particularly to Figs. 1 and 2 of the drawings, the improved mucking machine according to the present invention is referred to generally by the reference numeral 10, and includes a main frame 11 arranged to move upon crawler treads 12. An endless belt conveyor 13 is mounted in position above the frame 11 and includes a gathering apron 14 arranged to be raised and lowered about a pivot point 16 by means of hydraulic cylinders 17, such raising and lowering being in accordance with the irregularity of a mine floor 18 over which the machine 10 operates. The endless belt conveyor 13 also includes a discharge boom 19, where the conveying reach of the belt is reversed in direction, the belt being trained about a driving pulley 21 which is adjusted in its position by an adjusting screw 22. Power for driving the pulley 21 of the belt conveyor 13 is derived from a motor 23 mounted on supports 24, 26, the motor 23 driving a chain 27, in a manner well known in the art.

Power for driving the crawler treads 12 is derived from a drive motor 28, see particularly Fig. 2, which drives a pinion 29 meshing with a gear 31 mounted upon a shaft 32. The shaft 32 has a pair of sprockets 33 thereon which drive corresponding chain sprockets 34 upon an idler shaft 36. A chain sprocket 37 fast to one end of the shaft 36 drives a sprocket 38, see also Fig. 3, fast on a shaft 39 mounted in side frame members 41 and 42. The shaft 39 is selectively connected to drive final drive sprockets 40, 40 selectively in forward and reverse direction, said drive sprockets 40 driving sprockets 45, 45 fast upon a shaft 43 driving crawler tread sprockets, not shown, for the crawler treads 12 seen in Figs. 1 and 2.

Figure 3:
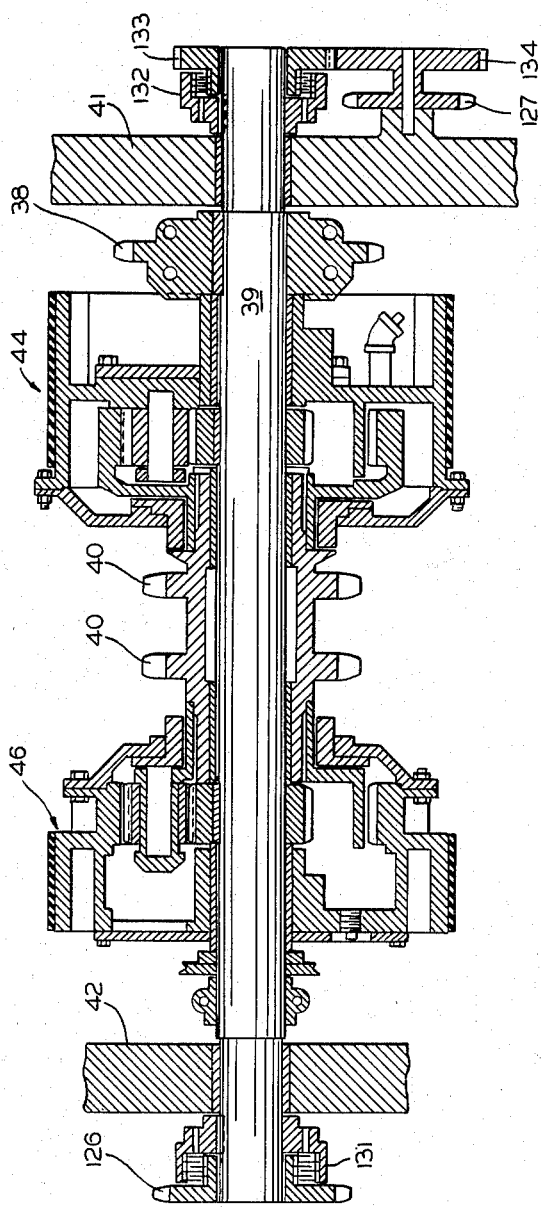
Fig. 3 is a longitudinal sectional view through the forward and reverse planetary mechanism for tramming the machine shown in Figs. 1 and 2, said section being taken along the line 3—3 of Fig. 2 and looking in the direction of the arrows.

Referring now to Fig. 3, the drive sprockets 40, 40 are selectively driven in forward and reverse directions by a forward planetary mechanism referred to generally by the reference numeral 44 and a reverse planetary mechanism referred to generally by the reference numeral 46. The precise form of construction of each of the planetary transmissions 44 and 46 forms no part of the present invention, and so they are not described in further detail.

The spaced frames 41 and 42 afford a support for lower superstructure frames 47 and 48 respectively, an upper superstructure frame 49 being pivotable about an axis 51 with respect thereto and being arranged to raise and lower with respect to the lower superstructure frames 47 and 48 by means of lifting cylinders 52 on each side thereof, see Figs. 1 and 2.

Figure 5:
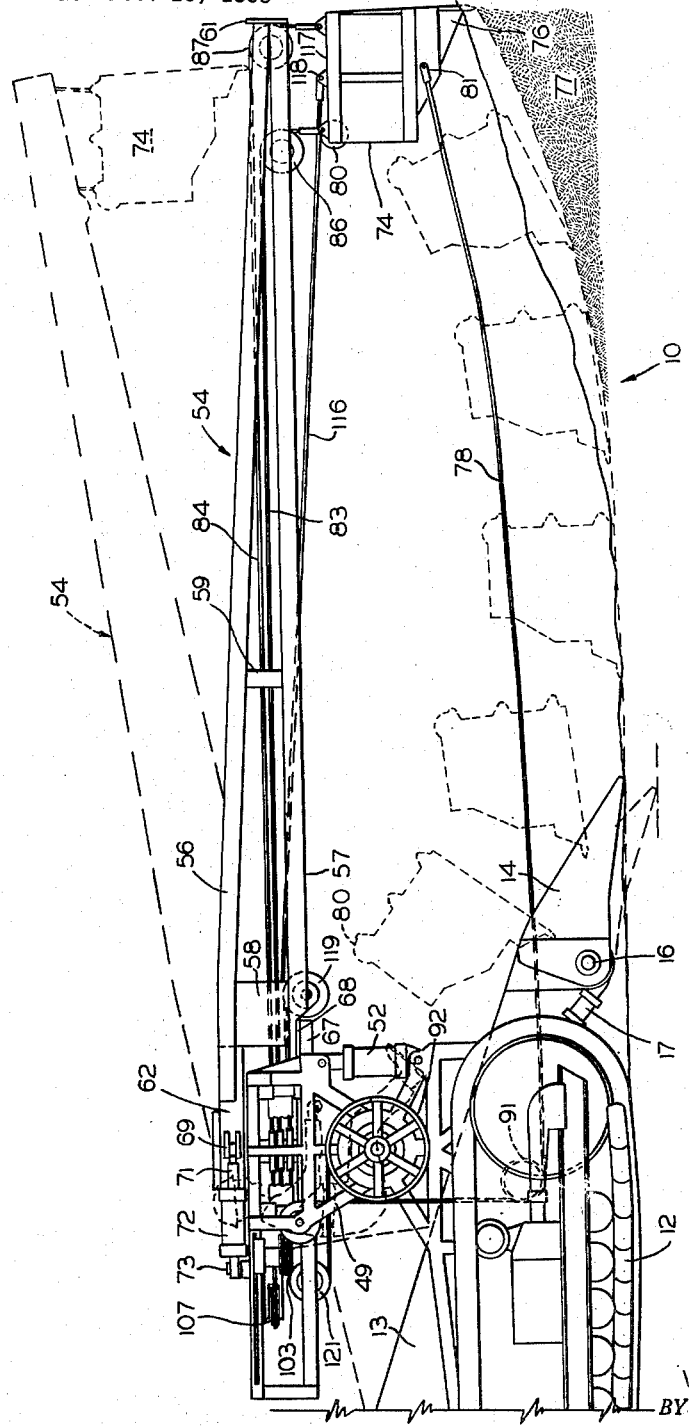
Fig. 5 is a partial side elevation view of the machine shown in Figs. 1 and 2 to a somewhat larger scale, and showing the positions taken by the bucket in excavating spoil.

The upper superstructure frame 49 affords a trunnion support 53 for a boom structure 54 consisting of upper and lower chord members 56 and 57 spaced apart vertically, as seen in Fig. 2, and joined by vertical web members 58, 59 and 61, see also Fig. 5. The upper chord members 56 are joined at a hub 62 arranged to turn about the trunnion 53, a cover plate 63 and cap screws 64 holding the hub 62 in place upon the trunnion 53. The lower chord boom members 57 are joined by an arcuate-shaped plate 66 which rides upon a similar arcuate-shaped plate 67, a wear plate 68 being interposed therebetween, see Figs. 1 and 2.

Means are provided for swinging the boom 54 about the trunnion 53 and to this end the hub 62 has lugs 69 extending therefrom to which are attached the piston rods 71 of actuating cylinders 72, each actuating cylinder 72 being hingedly connected at 73 to each side of the superstructure frame 49, see again Figs. 1 and 5.

Figure 4:
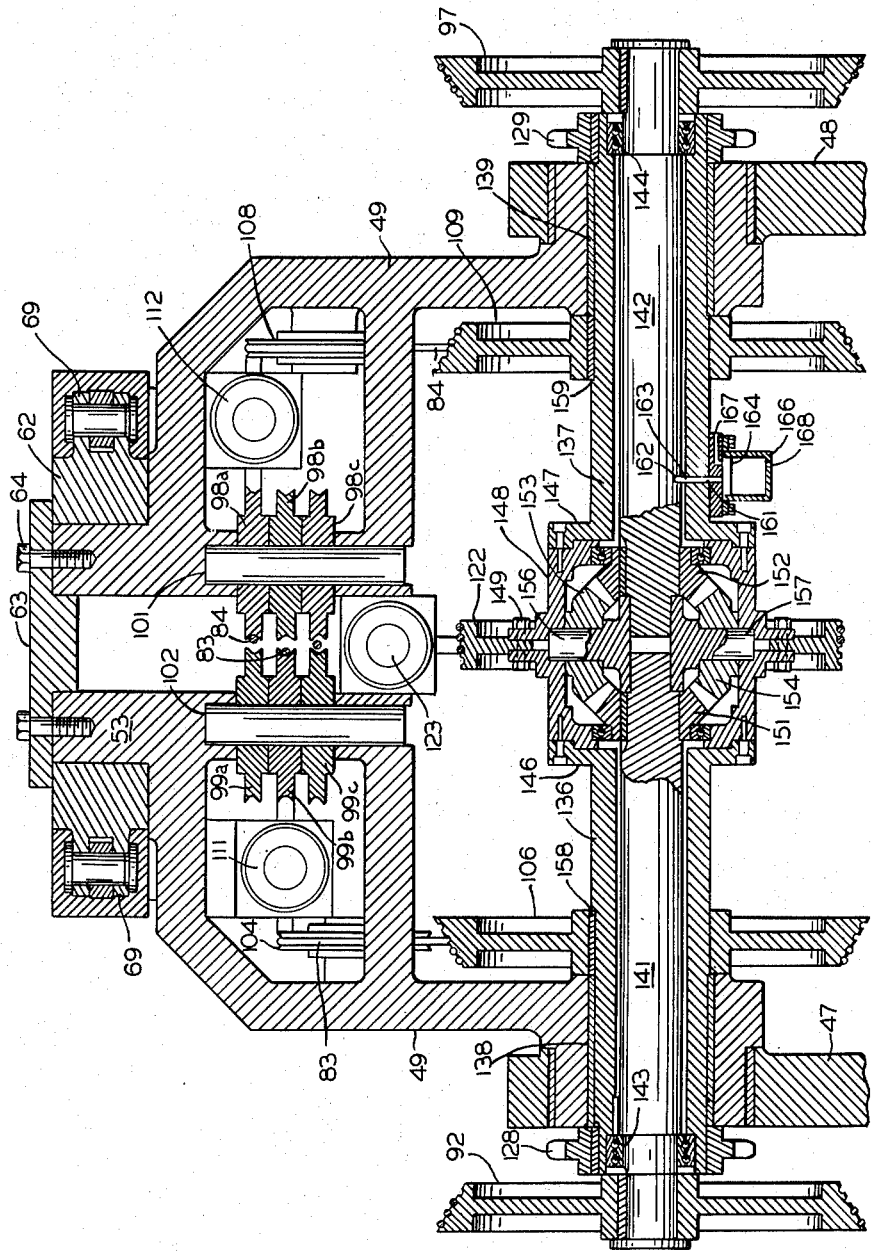
Fig. 4 is a vertical sectional view taken through the super structure of the machine shown in Fig. 2, to a larger scale than that shown in Fig. 2, said section being taken along the line 4—4 of Fig. 2 and looking in the direction of the arrows.
Figure 6:
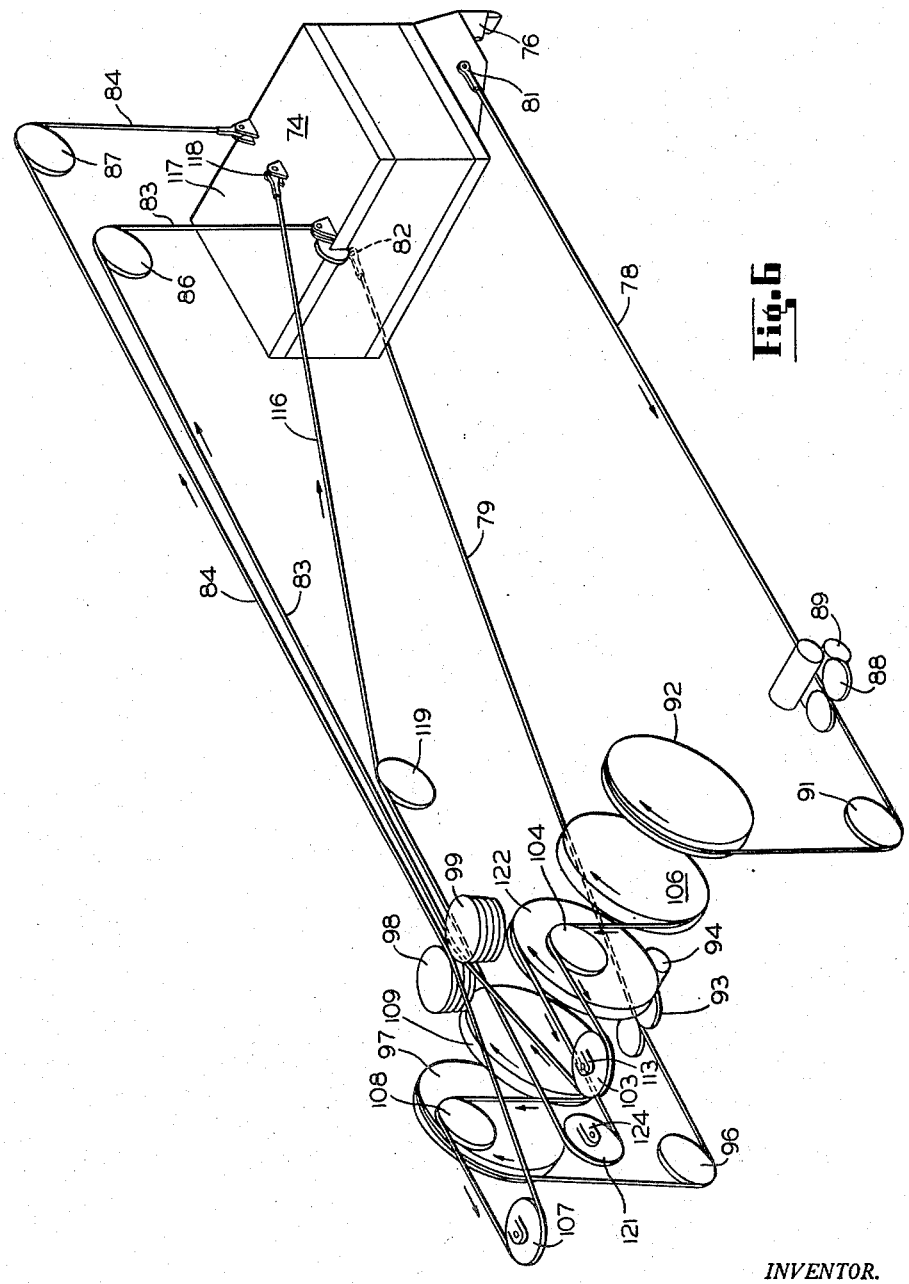
Fig. 6 is a schematic isometric view of the bucket or scoop and the driving and controlling mechanism therefor.

Referring now particularly to Figs. 4, 5 and 6 of the drawings, the mucking machine according to the present invention is arranged to provide the desired movement to a bucket 74 having a dipper lip 76 which is arranged to engage a bank of spoil as seen in Fig. 5. The bucket 74 is arranged to be crowded into the bank of spoil 77 by means of crowding cables 78 and 79 which are attached respectively at 81 and 82 to opposite sides of the bucket 74, and is arranged to be controlled in its movements from an operator's seat 75, there being one such control seat on each side of the machine.

The bucket 74 is arranged to move lengthwise of the boom 54, as seen in Fig. 5, and is suspended from the boom during such movement by cables 83 and 84 trained respectively around idler sheaves 86 and 87 disposed near the end of the boom 54. The cables 78 and 79 are guided in their movement by idler sheaves 88 and idler rollers 89 and are trained around an idler sheave 91, the cable 78 being wrapped about a cable drum 92. The cable 79 is similarly guided by idler sheaves 93 and idler rollers 94 and is trained around a sheave 96, the cable 79 then being wound about a cable drum 97.

Cable 83 is guided between idler sheaves 98b and 99b, turning about idler pins 101 and 102 respectively mounted in the superstructure frame 49, see Fig. 4. Cable 83 is then trained around a movable idler sheave 103 and then about a fixed idler sheave 104 and is then wrapped about a cable drum 106.

Flexible cable 84 is guided between idler sheaves 98a and 99a and then trained around a movable sheave 107, a fixed idler sheave 108, and then wrapped about a drum 109.

The two idler sheaves 103 and 107 are movable by actuating cylinders 111 and 112 respectively, the cylinders having movable piston rods 113 and 114 respectively, the cylinders being secured to the superstructure frame seen in Fig. 4.

A cable 116 is secured to the back 117 remote from the bucket teeth 76 and is flexible connected to the back 117 at 118, substantially at the mid point thereof. The cable 116 is trained around an idler sheave 119 held between the lower chord members 57 of the boom 54, as seen in Figs. 1 and 5, and is guided between guide sheaves 98c and 99c. The cable 116 is further trained around a movable idler sheave 121 and is then wrapped about a cable winding drum 122. The idler sheave 121 is arranged to be moved by an actuating cylinder 123 secured to the superstructure frame 49, said actuating cylinder 123 having a piston 124 connected to the movable idler sheave 121. The cable 116 is also arranged to be guided at times over a sheave 80 on the bucket 74 to cause discharge movement thereof, as will be described in further detail as the specification proceeds.

Means are provided for rotating the drums 92, 106, 122, 109 and 97 in forward or reverse directions as a unit, and to this end the shaft 39, see Fig. 3, is arranged to drive selectively a forward sprocket 126 and a reverse sprocket 127. Sprocket 126 is connected by a drive chain, not shown, to drive a sprocket 129, which in turn is drivably connected in such a fashion to rotate the drums 92, 106, 122, 109 and 107. Sprocket 127 is likewise connected by a second drive chain, not shown, to drive a sprocket 128 similarly connected to drive the aforesaid drums as will presently appear. As seen in Fig. 3, forward sprocket 126 is connected to the shaft 39 through the medium of a multi-disc clutch 131, while reverse sprocket 127 is connected to the shaft 39 through the medium of a multi-disc clutch 132 and gears 133 and 134.

The sprockets 128 and 129 are keyed respectively in the manner shown in Fig. 4 to hollow shafts 136 and 137 turning respectively in bushings 138 and 139 held in the pivotal upper frame structure 49. The hollow shafts 136 and 137 have normally turning therewith members 141 and 142 supported on bearings 143 and 144 respectively. The outer end of shaft 141 supports the winding drum 92 while the outer end of the shaft 142 supports the winding drum 97, the two being held fast to the shafts 141 and 142 respectively.

The shaft 136 has a flange 146 and the shaft 137 has a flange 147, the two flanges being connected to a differential housing 148, the winding drum 122 being supported on the housing 148 and being held by cap bolts 149 thereto. The inner end of the shafts 141 and 142 have fast thereto bevel gears 151 and 152 respectively, said bevel gears meshing with differential bevel gears 153 and 154 idling upon pinion shafts 156 and 157 supported by the differential housing 148. As seen in Fig. 4 the winding drums 106 and 109 are keyed respectively at 158 and 159 to the respective hollow shafts 136 and 137.

The wrapping of the cables 78 and 79 about their respective drums 92 and 97 pulls the bucket 74 towards the machine. As long as the tension on each cable 78 and 79 is uniform, the differential mechanism shown in Fig. 4 is inoperative. However, it is conceivable that the bucket 74 could become hung on a large stone which would cause all of the pull to be on cable 78 and none on the other cable 79 because of the differential mechanism shown in Fig. 3. To obviate such a possibility, which would skew the bucket 74 to a position where the bucket teeth 76 would not be normal to the path of movement of the bucket, the differential shown in Fig. 4 is locked at all times except when the boom 54 is being swung.

As seen in Fig. 4, the differential shown may be locked by means of a pin 161 extending within radial bores 162 and 163 in the shaft 142 and the hollow shaft 137 concentric therewith. The pin 161 is preferably hydraulically actuated and may be formed integrally with a piston 164 movable within a cylinder 166. Fluid under pressure is supplied to the cylinder 166 by means of pressure conduits 167 and 168, so that the direction of movement of the piston 164 and pin 161 may be effectively controlled.

It will be understood that cylinder 166 turns with the hollow shaft 137, and that during all operations where tension is exerted on the cables the shaft 136 and 137 are locked together by the pin 161.

Alternately to the differential mechanism shown and the locking means therefor, there may be provided a differential mechanism having the property of proportioning the torque between the cables 78 and 79, so that the bucket 74 will not become skewed by becoming hung at one end on a large stone or the like. Such a differential mechanism may be of the type as shown in Brubaker Patent No. 2,545,601, issued March 20, 1951 for Differential Mechanism.

When power is supplied to either the forward or reverse sprockets 128 and 129 all of the drums 92, 106, 122, 109 and 97 will rotate together as a unit in the same direction. Assuming a condition where the bucket 74 has discharged its contents onto the conveyor 13 and it is desired to return the bucket to the end of the boom 54, under such condition power will be supplied to the reverse sprocket 129 to drive the said winding drums in a counter clockwise direction as seen in Fig. 6, returning the bucket to the position as seen in Fig. 5. Under such conditions the winding drum 106 and 109 will wrap the cables 83 and 84 thereon while the drums 92 and 97 will pay out cable.

It will be assumed that the sheaves 103 and 107 are in their extended position, being actuated by their respective cylinders 112 and 111. When it is desired to drop the bucket 74 vertically to the bank of spoil, the movable idler sheaves 103 and 107 will be retracted by the respective cylinders 112 and 111, thereby permitting slack in the respective cables 83 and 84, thereby causing the bucket to drop upon the bank of spoil 77.

When it is desired to move the bucket from the solid line position seen in Fig. 5 through the successive positions shown in dotted outline, the winding drums are again operated but this time in a clockwise direction by means of the forward driving sprocket 128. This causes the cables 78 and 79 to be wrapped about their respective winding drums 92 and 97, and the cables 83, 84 and 116 to be unwrapped from their respective drums 106, 109 and 122.

It will be noted from Fig. 4 that the paired drums 92, 106 for the cables 78 and 83, respectively, are provided with tapered peripheries, and that the paired drums 97 and 109 for the respective cables 79 and 84 are similarly tapered. When the bucket 74 is in elevated position at the end of the boom 54, cable 78 is wound on the tapered drum only at the small diameter thereof, while cable 83 is completely wound upon its drum 106 and is paying out from the largest diameter thereof.

The same situation obtains respectively for the paired drums 97 and 109 and their cables 79 and 84.

It will be apparent that as the digging operation commences, cables 83 and 84 will be payed out at a rapid rate, while cables 78 and 79 will be reeled in at a slower rate. Such action will enable the bucket 74 to be tilted backward so as to adopt the best digging angle as seen in Fig. 5, and subsequently to be dragged along the floor prior to being discharged above the apron 14.

However, the digging angle of the bucket 74 may be adjusted by controlling the effective length of the cables 83 and 84 by operation of their respective cylinders 112 and 111. As seen in Fig. 5, the two cables 83 and 84 may also be further adjusted in their effective length so as to cause the bucket to be elevated above the endless conveyor 13, and in order to tilt the bucket to the position shown above the conveyor 13, the movable idler sheave 121 may be moved to the left, as seen in Fig. 6, to change the effective length of the cable 116, and thereby place a pull thereon to cause the bucket to rock to the position for discharge as seen in Fig. 5. As seen in Figs. 1 and 5, the bucket is provided with the sheave 80 over which the cable 116 is at times trained so as to force the bucket to be rocked to the position of discharge on to the gathering apron 14.

All of the functions described may be controlled from either of the operator's stations 75 flanking the winding drums 97 or 92, identical controls for the functions described being provided at each station. The precise form of the several controls for the functions described form no part of the invention herein.

The mechanism according to the present invention presents many improvements over the mucking machines of the prior art. The most important of these advantages lies in the fact that the material is removed by what may be considered to be a hoeing action, the only lifting operation necessary being that to lift the loaded bucket into position overlying the conveyor, in which position the bucket is tilted for discharge. All of the apparatus for moving the bucket both to its return position at the end of the boom and for loading and moving same onto a conveyor is accomplished by cables, there being only a single rigid boom member, rather than an articulated boom such as has been found in machines of the prior art. A further advantage lies in the fact that all of the movement of such flexible cables is accomplished by winding drums all rotating in the same direction upon a common axis.

While the invention has been described in terms of a preferred embodiment thereof, its scope is intended to be limited only by the claims here appended.

I claim as my invention:

1. In an excavating machine, a boom including means for swivelling said boom about a substantially vertical axis, an excavating bucket suspended from said boom, draft means for moving said bucket with respect to said boom for excavating material, said draft means including a pair of cables for returning said bucket to an initial digging position at the end of said boom, a pair of cables connected one to each side of said bucket for crowding same into material to be excavated, a cable connected to said bucket and controlling the discharge position thereof, means for controlling the movement of all of said cables by winding thereof upon drums in directions corresponding to the movement of said bucket, said means including a plurality of drums arranged to turn on a common axis, means for guiding the return cables and the discharge control cable past the center of swivelling movement of said boom, means for controlling the effective length of said last named cables during the digging operation of said bucket to control the digging position thereof, means connecting the drums for winding said crowding cables together for differential movement so as to enable said crowding cables to have lengths corresponding to the amount of swivelling movement of said boom, and means for locking said last named drums against differential movement during crowding by said crowding cables.

2. In an excavating machine, a boom including means for swivelling said boom about a substantially vertical axis, an excavating bucket suspended from said boom, draft means for moving said bucket with respect to said boom for excavating material, said draft means including a pair of cables for returning said bucket to an initial digging position at the end of said boom, a pair of cables connected one to each side of said bucket for crowding same into material to be excavated, a cable connected to said bucket and controlling the discharge position thereof, means for controlling the movement of all of said cables by winding thereof upon drums in directions corresponding to the movement of said bucket, said means including a plurality of drums arranged to turn on a common axis, means for guiding the return cables and the discharge control cable past the center of swivelling movement of said boom, means for controlling the effective length of said last named cables during the digging operation of said bucket to control the digging position thereof, and means for connecting the drums for winding said crowding cables together for differential movement so as to enable said crowding cables to have lengths corresponding to the amount of swivelling movement of said boom.

3. In an excavating machine, a swingable boom having a bucket suspended therefrom, cables for moving said bucket with respect to said boom for excavating material, said cables including a pair of cables for returning said bucket to an initial digging position at the end of said boom, a pair of cables for crowding said bucket into material to be excavated, said last named cables extending substantially parallel to the ground during the digging operation, a cable connected to said bucket and controlling the discharge thereof, means for controlling the movement of said cables by winding thereof upon drums in directions corresponding to the movement of said bucket, said means including a plurality of drums arranged to turn on a common axis, means for controlling the position of said bucket during its digging and discharge operations comprising means for varying the effective length of some of said cables, means for connecting said drums for winding said crowding cables together for differential movement, so as to enable said crowding cables to have lengths corresponding to the amount of such swinging movement, and means for locking said last named drums against differential movement during crowding by said crowding cables.

4. In an excavating machine, a swingable boom having a bucket suspended therefrom, cables for moving said bucket with respect to said boom for excavating material, said cables including a pair of cables for returning said bucket to an initial digging position at the end of said boom, a pair of cables for crowding said bucket into material to be excavated, said last named cables extending substantially parallel to the ground during the digging operation, a cable connected to said bucket and controlling the discharge thereof, means for controlling the movement of said cables by winding thereof upon drums in directions corresponding to the movement of said bucket, said means including a plurality of drums arranged to turn on a common axis, means for controlling the position of said bucket during its digging and discharge operations comprising means for varying the effective length of some of said cables, and means for connecting the drums for winding said crowding cables together for differential movement so as to enable said crowding cables to have lengths corresponding to the amount of swinging movement of said boom.

5. In an excavating machine, a fixed main frame, a boom which is swingable with respect to said fixed main frame and having a bucket suspended therefrom, cables for moving said bucket with respect to said boom for excavating material, said cables including a pair of cables for returning said bucket to an initial digging position at the end of said boom, a pair of cables for crowding said bucket into material to be excavated, said last named cables extending substantially parallel to the ground during the digging operation, a cable connected to said bucket and controlling the discharge thereof, means for controlling the movement of said cables by winding thereof upon drums in directions corresponding to the movement of said bucket, said means including a plurality of drums mounted on said fixed main frame and arranged to turn on a common axis, and means for controlling the position of said bucket during its digging and discharge operations comprising means for varying the effective length of some of said cables.

6. In an excavating machine, a fixed main frame, a boom which is swingable with respect to said fixed main frame and having a bucket suspended therefrom, cables for moving said bucket with respect to said boom for excavating material, said cables including a pair of cables for returning said bucket to an initial digging position at the end of said boom, a pair of cables for crowding said bucket into material to be excavated, means for controlling the movement of said cables by winding thereof upon drums in directions corresponding to the movement of said bucket, said drums being mounted on said fixed main frame, and means for causing the bucket to adopt different positions of tilt during digging thereby and while being transported by said first named cables by winding and unwinding of said cables from said drums at varying rates.

7. In an excavating machine, a swingable boom having a bucket suspended therefrom, cables for moving said bucket with respect to said boom for excavating material, said cables including a pair of cables for returning said bucket to an initial digging position at the end of said boom, a pair of cables for crowding said bucket into material to be excavated, and means for controlling the movement of said cables by winding thereof upon drums in directions corresponding to the movement of said bucket, said means including a plurality of drums arranged to turn on a common axis, said drums having varying diameters so that the winding and unwinding of said cables at varying rates will cause the bucket to adopt different positions of tilt for digging.

8. In an excavating machine, a fixed main frame, a boom which is swingable with respect to said fixed main frame and having a bucket suspended therefrom, cables for moving said bucket with respect to said boom for excavating material, said cables including a pair of cables for returning said bucket to an initial digging position at the end of said boom, a pair of cables for crowding said bucket into material to be excavated, means for controlling the movement of said cables by winding thereof upon drums in directions corresponding to the movement of said bucket, said drums being mounted on said fixed main frame and having varying diameters so that the winding and unwinding of said cables at varying rates will cause the bucket to adopt different positions of tilt for digging.

References Cited in the file of this patent

UNITED STATES PATENTS

| | | |
|---|---|---|
| 1,501,795 | Mitchell | July 15, 1924 |
| 1,931,221 | Cummings et al. | Oct. 17, 1933 |
| 2,016,130 | Wren | Oct. 1, 1935 |
| 2,024,557 | White | Dec. 17, 1935 |
| 2,102,313 | Fraser | Dec. 14, 1937 |
| 2,191,696 | Jacoby et al. | Feb. 27, 1940 |
| 2,381,515 | Poston | Aug. 7, 1945 |
| 2,414,771 | Shafer, Jr. | Jan. 21, 1947 |
| 2,448,631 | Selak | Sept. 7, 1948 |
| 2,484,709 | Heath | Oct. 11, 1949 |
| 2,627,357 | Biedess | Feb. 3, 1953 |